(12) United States Patent
Shelekhov (10) Patent No.: US 8,242,299 B2
(45) Date of Patent: Aug. 14, 2012

(54) NON-SHRINKABLE SOL-GEL-POLYMER HYBRID AND METHODS THEREOF

(75) Inventor: Nikita Sergeevich Shelekhov, Avon (FR)

(73) Assignee: Corning Incorporated, Corning, NY (US)

( * ) Notice: Subject to any disclaimer, the term of this patent is extended or adjusted under 35 U.S.C. 154(b) by 310 days.

(21) Appl. No.: 12/786,852

(22) Filed: May 25, 2010

(65) Prior Publication Data
US 2011/0207206 A1 Aug. 25, 2011

(30) Foreign Application Priority Data

Feb. 25, 2010 (EP) ..................................... 10305187

(51) Int. Cl.
*C08K 5/05* (2006.01)
*C08K 3/18* (2006.01)
*C07F 7/04* (2006.01)

(52) U.S. Cl. ........ 556/482; 556/483; 525/903; 428/447; 526/273

(58) Field of Classification Search .................. 556/482, 556/483; 525/903; 428/447; 526/273
See application file for complete search history.

(56) References Cited

U.S. PATENT DOCUMENTS

| 5,223,862 A | 6/1993 | Dasher et al. ................. 351/163 |
| 6,080,816 A * | 6/2000 | Gregorovich et al. ........ 525/100 |
| 6,433,076 B1 * | 8/2002 | Kamimura et al. ............ 524/837 |
| 2003/0073779 A1* | 4/2003 | Tamori et al. ................. 524/588 |
| 2005/0244658 A1 | 11/2005 | Bae et al. ...................... 428/447 |
| 2008/0145307 A1 | 6/2008 | Kosuda et al. ................ 423/608 |

FOREIGN PATENT DOCUMENTS

EP 0 581 576 A1 2/1994

OTHER PUBLICATIONS

Hay, et al., "Synthesis of Organic-Inorganic Hybrids Via the Non-Hydrolytic Sol-Gel Process," Chemical Materials, vol. 13, 2001, pp. 3396-3403.

* cited by examiner

*Primary Examiner* — Satya Sastri
(74) *Attorney, Agent, or Firm* — John L. Haack (57) ABSTRACT

A composite including a cross-linked interpenetrating network of an organic polymer including an alcohol adduct of, for example, a glycidyl ether substituted acrylate or epoxy substituted acrylate; and a sol-gel polymer. The composite having a low or no-shrinkage characteristic, and a method for making and using the composite, as defined herein.

10 Claims, 3 Drawing Sheets

$R^1OH + CH_2=(O)=CH_2-(CH_2)_2-O-C(=O)-C(CH_3)=CH_2 \rightarrow$ (20)

$R^1O-CH_2-CH_2(OH)-(CH_2)_2-O-C(=O)-C(CH_3)=CH_2 \rightarrow$ (30)

$-\{-C(CH_3)-CH_2-\}_p-$
$\qquad\qquad\qquad |$
$R^1O-CH_2-CH_2(OH)-(CH_2)_2-O-C(=O)$ (40)

Fig. 3

NON-SHRINKABLE SOL-GEL-POLYMER HYBRID AND METHODS THEREOF

CLAIMING BENEFIT OF PRIOR FILED U.S. APPLICATION

This application claims the benefit of EP Application Serial No. 10305187.6, filed on Feb. 25, 2010. The content of this document and the entire disclosure of any publications or patent documents mentioned herein are incorporated by reference.

BACKGROUND

The disclosure relates generally to non-shrinking composites comprising chemically linked organic and inorganic moieties, and methods of making and using the composites.

SUMMARY

The disclosure provides a composite material comprised of interpenetrating organic and inorganic polymer networks having, for example, a very low or no-shrinkage characteristic and to methods for making and using the composite.

BRIEF DESCRIPTION OF THE DRAWING(S)

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosure provides processes for the preparation of composite materials that are substantially non-shrinking or completely non-shrinking. The preparative process produces an inorganic-organic metal alkoxide matrix or network having interpenetrating organic polymers.

The starting reaction mixture can include, for example, a metal (M) alkoxide (were M is Si, Al, Ti or Zn) and a diol, a glycol (such as ethylene glycol, propane-1,2-diol, Bisphenol A ethoxylate/propoxylate, and like glycols) or a polydiol (such as polyethyleneglycol, polypropyleneglycol, and like polydiols), then subsequently is added an unsaturated monomer/oligomer having at least one epoxy group, glycidyl group, glycidyl ether group such as glycidyl methacrylate, and like epoxy or glycidyl groups, a cross-linking agent such as acrylic or methacrylic diesters of mono-diethylene glycol or divinylbenzene, and a free radical polymerization initiator such as, 2,2'-azodiisobutyronitrile (AIBN), benzoyl peroxide, dicumyl peroxide and like initiators.

The alcoholysis of metal alkoxides provides an inorganic-organic polymer comprising the following units -{-M-O—$R^2$—O—}$_n$-. Simultaneously, a product of the alcoholysis reaction, a primary alcohol reacts with epoxy or glycidyl containing unsaturated monomer and forms in situ a new monomer having ether groups in the side chain. The new monomer polymerizes and cross-links with the cross-linking agent.

The disclosure provides a one-pot synthesis consisting of three distinct reaction sequences, including: sol-gel, reaction of the by-product (alcohol) with an epoxy or glycidyl unsaturated monomer, and polymerization of the reaction product of the alcohol and the epoxy or glycidyl unsaturated monomer. The process provides a solid inorganic-organic network having cross-linked organic polymeric chains that interpenetrate the network.

In embodiments, the disclosure provides a number of particularly useful aspects, especially for larger scale production, including, for example:

products having improved thermo-mechanical properties attributable to the intimate combination of a sol-gel-polymer network and a cross-linked organic polymer network;

low cost of composite materials from low cost commercially available starting material; and reduced energy costs from the lower synthesis temperature and avoiding extensive liquid by-product (alcohol) removal.

Other particularly useful aspects and considerations of the disclosed process and materials, include for example:

the reactions do not require solvent;

the process yields a highly homogeneous transparent composite even when precursors of the sol-gel process do not contain any polymerisable groups;

high yields of the final solid product (e.g., greater than 90%);

crack-free final products;

the final solid products have high dimensional stability attributable to the absence of liquid by-product in the process and products; and the process permits the use of a wide variety of different metal alkoxides and organic reactants moieties to obtain composites having a wide spectrum of tailored properties.

Definitions

"Sol-gel polymer composite" refers to a composite or nanocomposite material comprised of interpenetrating organic and sol-gel polymer networks and prepared in accordance with the disclosure.

"Metal oxide," "metal oxide source," and like terms refer to any starting material or any intermediate product that can lead to the inorganic matrix and is further capable of bonding with the polymeric organic portion of the composite composition.

"Hydrocarbon," "hydrocarbyl," "hydrocarbylene," "hydrocarbyloxy," and like terms refer to monovalent, such as —$R^1$ or —$R^3$, or divalent —$R^2$— moieties, and can include, for example, alkyl hydrocarbons, aromatic or aryl hydrocarbons, alkyl substituted aryl hydrocarbons, alkoxy substituted aryl hydrocarbons, heteroalkyl hydrocarbons, heteroaromatic or heteroaryl hydrocarbons, alkyl substituted heteroaryl hydrocarbons, alkoxy substituted heteroaryl hydrocarbons, and like hydrocarbon moieties, and as illustrated herein.

"Oxyhydrocarbylene," "oxyhydrocarbyl," and like terms refer to divalent oxygenated hydrocarbylene moieties of, for example, of the formula —$CHR^4$—$CHR^4$—$(O$—$CHR^4$—$CHR^4)_z$—, where z can be an integer of from 1 to about 10, and $R^4$ can be H, or a branched or unbranched, substituted or unsubstituted ($C_{1-8}$)alkyl. Such oxyhydrocarbylene moieties can be, for example, an oligomeric or polymeric alkylene oxide, such as a polyethylene glycol (PEG), a polypropylene glycol (PPG), or like oxyhydrocarbylenes. Numerous suitable oxyhydrocarbylene compounds are commercially available, such as from Sigma-Aldrich.

"Alkyl" includes linear alkyls, branched alkyls, and cycloalkyls.

"Substituted alkyl" or "optionally substituted alkyl" refers to an alkyl substituent, which includes linear alkyls, branched alkyls, and cycloalkyls, having from 1 to 4 optional substituents selected from, for example, hydroxyl (—OH), halogen, amino (—NH$_2$), nitro (—NO$_2$), alkyl, acyl (—C(=O)R), alkylsulfonyl (—S(=O)$_2$R) or alkoxy (—OR). For example, an alkoxy substituted alkyl, can be a 2-methoxy substituted ethyl of the formula —CH$_2$—CH$_2$—O—CH$_3$, a 1-dialkylamino substituted ethyl of the formula —CH$_2$(NR$_2$)—CH$_3$, and like substituted alkyl substituents.

"Aryl" includes a mono- or divalent- phenyl radical or an ortho-fused bicyclic carbocyclic radical having about nine to twenty ring atoms in which at least one ring is aromatic. Aryl (Ar) can include substituted aryls, such as a phenyl radical having from 1 to 5 substituents, for example, alkyl, alkoxy, halo, and like substituents.

"Het" includes a four-(4), five-(5), six-(6), or seven-(7) membered saturated or unsaturated heterocyclic ring having 1, 2, 3, or 4 heteroatoms selected from the group consisting of oxy, thio, sulfinyl, sulfonyl, and nitrogen, which ring is optionally fused to a benzene ring. Het also includes "heteroaryl," which encompasses a radical attached via a ring carbon of a monocyclic aromatic ring containing five or six ring atoms consisting of carbon and 1, 2, 3, or 4 heteroatoms each selected from the group consisting of non-peroxide oxy, thio, and N(X) wherein X is absent or is H, O, (C$_{1-4}$)alkyl, phenyl, or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto.

In embodiments, halo or halide includes fluoro, chloro, bromo, or iodo. Alkyl, alkoxy, etc., include both straight and branched groups; but reference to an individual radical such as "propyl" embraces only the straight chain radical, a branched chain isomer such as "isopropyl" being specifically referred to.

The carbon atom content of various hydrocarbon-containing (i.e., hydrocarbyl) moieties can alternatively be indicated by a prefix designating a lower and upper number of carbon atoms in the moiety, i.e., the prefix C$_{i-j}$ indicates a moiety of the integer "i" to the integer "j" carbon atoms, inclusive. Thus, for example, (C$_1$-C$_7$)alkyl or C$_{1-7}$alkyl refers to alkyl of one to seven carbon atoms, inclusive, and hydrocarbyloxy such as (C$_1$-C$_8$)alkoxy or C$_{1-8}$alkoxy refers to alkyl of one to eight carbon atoms, inclusive.

Specifically, C$_{1-7}$alkyl can be methyl, ethyl, propyl, isopropyl, butyl, iso-butyl, sec-butyl, tert-butyl, pentyl, 3-pentyl, hexyl, or heptyl; (C$_{3-12}$)cycloalkyl can be cyclopropyl, cyclobutyl, cyclopentyl, cyclohexyl, cycloheptyl, cyclooctyl, bicyclic, tricyclic, or multi-cyclic substituents.

C$_{1-8}$alkoxy can be methoxy, ethoxy, propoxy, isopropoxy, butoxy, iso-butoxy, sec-butoxy, pentoxy, 3-pentoxy, hexyloxy, 1-methylhexyloxy, heptyloxy, octyloxy, and like substituents.

Aryl (Ar) can be phenyl, naphthyl, anthracenyl, phenanthrenyl, fluorenyl, tetrahydronaphthyl, or indanyl. Het can be pyrrolidinyl, piperidinyl, morpholinyl, thiomorpholinyl, or heteroaryl. Heteroaryl can be furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) or quinolyl (or its N-oxide).

A specific value for Het includes a five-(5), six-(6), or seven-(7) membered saturated or unsaturated ring containing 1, 2, 3, or 4 heteroatoms, for example, non-peroxide oxy, thio, sulfinyl, sulfonyl, and nitrogen; as well as a radical of an ortho-fused bicyclic heterocycle of about eight to twelve ring atoms derived therefrom, particularly a benz-derivative or one derived by fusing a propylene, trimethylene, tetramethylene or another monocyclic Het diradical thereto.

Other conditions suitable for formation and modification of the compounds, oligomers, polymers, composites, or like products and articles of the disclosure, from a variety of starting materials or intermediates, as disclosed and illustrated herein are known. For example, see Feiser and Feiser, "Reagents for Organic Synthesis", Vol. 1, et seq., 1967; March, J. "Advanced Organic Chemistry," John Wiley & Sons, 4$^{th}$ ed. 1992; House, H. O., "Modern Synthetic Reactions," 2$^{nd}$ ed., W. A. Benjamin, New York, 1972; and Larock, R. C., "Comprehensive Organic Transformations," 2$^{nd}$ ed., 1999, Wiley-VCH Publishers, New York. The starting materials employed in the preparative methods described herein are, for example, commercially available, have been reported in the scientific literature, or can be prepared from readily available starting materials using procedures known in the field. It may be desirable to optionally use a protecting group during all or portions of the above described or alternative preparative procedures. Such protecting groups and methods for their introduction and removal are known in the art. See Greene, T. W.; Wutz, P. G. M. "Protecting Groups In Organic Synthesis," 2$^{nd}$ ed., 1991, New York, John Wiley & Sons, Inc.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compounds, compositions, composites, concentrates or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments refers, for example, to a sol-gel polymer composition, to a method of making or using the hybrid sol-gel polymer composition, or formulation, and articles, devices, or any apparatus of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, excessive, extended, or unnecessary exposure of the resulting composite product to high heat or high drying temperatures; insufficient heating in the first or second heating resulting in incomplete alcoholysis and polymerization reactions, respectively; and like conditions.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, cross-linkers, initiators, promoters, and like aspects, and ranges thereof, are for illustration only; they do not exclude other defined values or other values within defined ranges. The compositions, apparatus, and methods of the disclosure can include any value or any combination of the values, specific values, more specific values, and preferred values described herein.

The sol-gel process is an established method for glass preparation that doesn't require high temperatures as with a traditional method of forming inorganic oxide glass, such as $SiO_2$ by melting glass forming compounds at high temperatures, for example, more than 1,400° C. With the sol-gel method the condensation of reactive hydrolyzed metal alkoxides can occur in the liquid phase at temperatures, e.g., from about 25 to about 60° C. One common sol-gel process is a two step process where metal alkoxides are first hydrolyzed to form metal hydroxides then the hydroxides condense to form a three-dimensional network. For additional definitions, descriptions, and methods of silica materials and related metal oxide materials, see for example, R. K. Iler, *The Chemistry of Silica*, Wiley-Interscience, 1979.

Inorganic-organic composite materials are increasingly important due to their extraordinary properties which arise from the synergism between the properties of the components. The possible applications of the described materials are manifold and the future of these materials offers promise, in particular the vast number of different combinations in nanocomposites between organic and inorganic species allow properties which can not be obtained by traditional composite materials (see Sanchez C., et al., *J. Mater. Chem.*, 15, 3559, 2005, and Aegerter, M. A. et al., *J. Sol-Gel Sci. Technol.*, 47, 203, 2008). A challenge in the design of these hybrid organic-inorganic systems is a control of the mixing between the two dissimilar species which determines such important parameters as the homogeneity of the final product. The formation of interpenetrating networks (IPNs) between organic and inorganic moieties is one way to resolve this problem. The simultaneous synthesis of networks can result in the most homogeneous type of material (Kickelbick G., *Frog. Polymer Sci.*, 28, 83, 2003).

A major issue during this process arises from the different stabilities of the moieties. While inorganic systems are thermally quite stable and are often formed at high temperature, most organic ingredients have an upper temperature limit of around 250° C. Therefore, the synthesis of hybrid composite systems requires a strategy wherein the formation of the components is well-suited to each, e.g., the use of a low-temperature formation procedure. For this reason milder reactions have to be applied for the formation of inorganic network. An ideal procedure for the generation of such composite materials is the sol-gel process. The sol-gel method allows composite materials made of inorganic and organic components which would not survive the very high temperatures of traditional glass making methods.

Acid or base catalysts may be used for hydrolysis process. By varying the catalysts, significant effects on gelation time, bulk and apparent density, and volume shrinkage on drying are observed (Brinker C. J., et al., *Sol-gel Science*, San Diego: Academic Press; 1990).

The sol-gel process through transalcoholysis (transesterification) of different metal alkoxides (Si, Al, etc.) is known (see Touati F. et al., *J. Sol-Gel Sci. Technol.*, 8, 595, 1997, Brandhuber D. et al., *Chem. Mater.*, 17, 4262, 2005, Tangwiwat S. et al., *J. Non-Cryst. Solids*, 351, 976, 2005, Eo Y.-J. et al., *J. Mater. Res.*, 20 (2), 401, 2005, Kang E.-S. et al., *J. Mater. Res.*, 21 (5), 1286, 2006, Fornasieri G. et al., *J. Am. Chem. Soc.*, 127, 4869, 2005, and Trabelsi S., et al., *Macromolecules*, 38, 6068, 2005). The reaction of metal alkoxides with a variety of glycols or alcohols at room temperature produces a gel at times ranging from a few minutes to a few days.

Alcoholysis with ethylene glycol and propane-1,2-diol has been studied (see Brandhuber, Tangwiwat, and Eo supra) by IR and NMR spectroscopy. In particular, it is shown that an interchange reaction between alkoxyl groups of metal alkoxides and diols groups occurs, leading to the hybrid gels. A simplified reaction scheme is represented by the following reaction:

where $R^1OH$ is liquid by-product, and M is metal.

Recently, procedures were reported for preparation of metal oxides from metal alkoxides without using water. One of those procedures is represented by so-called "nonhydrolytic sol-gel process", which involves the reaction of metal alkoxides and metal halides (see Grader G. S. et al., *J. Sol-Gel Sci. Technol.*, 21, 157, 2001). The main disadvantage of this specific process is an evolution of a hazardous by-product —HCl.

Nevertheless, considering the many unique positive attributes or advantages of the sol-gel process, there are disadvantages, especially in the case of the synthesis of monolithic hybrid composites. For example, the gelled $SiO_2$ network, once formed, must be dried, including the removal of cosolvent(s) and liberated alcohol or/and excess water. This drying process effectively prevents the practical and reproducible synthesis of monoliths or thick films with dimensions greater than a few millimeters, because these objects tend to shrink, crack, and shatter. Cracking can be minimized in several ways, including for example, very slow controlled drying (such as over weeks or months), by increasing the average pore size through the introduction of colloidal silica seed particles, by adding surfactants, by supercritical drying, or by the addition of special reagents. One major obstacle to the widespread application of sol-gel techniques is that the drying process can be accompanied by extraordinary shrinkage of the solid inorganic phase. Related to the volume fraction of volatiles removed, this shrinkage is routinely on the order of about 50 to about 70% (see Novak B. M., et al., *Mater. Sci. and Eng.*, A162, 257, 1993). Shrinkage on this scale precludes many molding applications and introduces a high degree of stress in sol-gel monolithic composites and drastically reduces the mechanical properties of the cured hybrids. In the view of this, the resulting yield of solid product of sol-gel process is limited to about 20 to 30 wt %. Even for solvolysis of metal alkoxides with pure organic acids, without water and cosolvent(s), there are liquid by-products (acid esters and water as the polycondensation by-product).

So, shrinkage is common in sol-gel techniques even for a transesterification reaction where an alcohol has to be removed to obtain a final solid product. Minimizing the inorganic matrix shrinkage is particularly significant in the fabrication of composites using sol-gel processes as the shrinking tends to induce a high degree of stress within the material, particularly if the organic polymer is below its glass transition temperature.

In an effort to surmount this problem, Novak has proposed to synthesize a series of tetraalkoxysilane derivatives possessing polymerizable alkoxide groups in place of the standard ethoxide or methoxide groups (see Novak B. M., et al., *Mater. Sci. and Eng.*, A162, 257, 1993). The hydrolysis and condensation of these siloxanes derivatives liberate a polymerizable unsaturated alcohol. In the presence of the appropriate catalyst (e.g., free radical or ROMP), and by using a stoichiometric amount of water and the corresponding alcohol as cosolvent, all components of these derivatives are polymerized. Since both the cosolvent and the liberated unsaturated alcohol polymerize, gel drying process is much shorter and the product shrinkage is minimized.

The disadvantages of this method include, for example: the synthesis of special metal alkoxides containing the polymerizable groups (non-commercial reagents); in-complete avoidance of the shrinkage effect as the by-product of polycondensation process (water) has to be removed with the drying of the final solid product.

However, it is known that primary alcohols can react with reagents containing epoxy (e.g., glycidyl) groups at ambient temperature without any catalysts (see Novak B. M., *Advan. Mater.*, 5(6), 423, 1993) to form alkyl-alkyl ethers containing hydroxyl groups. Also this reaction has been used for removing the residual by-product from the synthesis of organic-inorganic hybrids (see generally Roberts J. D., et al., *Basic principles of organic chemistry*, W. A. Benjamin, Inc., NY, Vol. 1, 1964). However, the prior disclosure employed the multi-step process where the first step was an acid hydrolysis of alkoxysilane (tetraethoxysilane, HCl, and water) in a solvent (tetrahyrofuran) followed by evaporation of the main part of the by-products (i.e., ethyl alcohol) and solvent with a vacuum pump. Residual alcohol by-product was removed by reaction with glycidyl methacrylate (GMA) catalyzed with $SnCl_4$.

Figure 2:
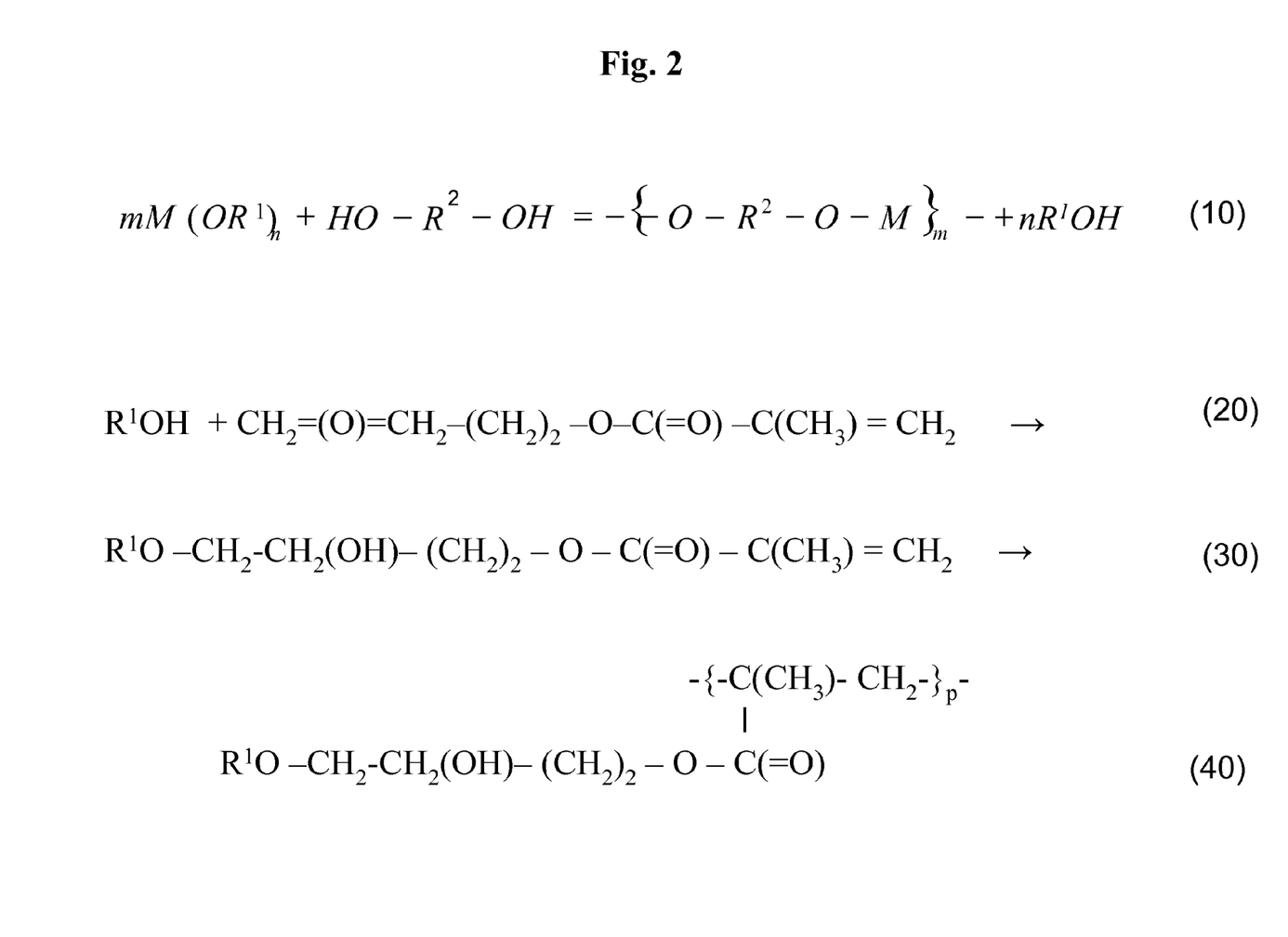
FIG. 2 shows a schematic of the chemical reactions leading to a composite of FIG. 1 comprised of a sol-gel network, and an interpenetrating organic polymer network, optionally having cross-linking (not shown).

In embodiments, the disclosed process can be summarized in the reaction sequence shown in FIG. 2, where $R^1OH$ is a liquid by-product, M is a metal, R and $R^1$ are, for example, alkyl, m is arbitrary, and n can be 1 to 5, and p can be from about 10 to about 100,000,000 or more.

Monomers containing epoxy or glycidyl groups are reactive enough and can interact with M-OH end-groups of the main product of the sol-gel process. This provides the possibility of grafting monomers having epoxy reactive groups on the inorganic-organic chains and the participation of inorganic-organic and pure organic parts in a polymerization process forming a completely homogeneous final product.

Consequently, the use of the transesterification sol-gel process without any solvent and the sequential reaction of an alcohol (by-product) with a monomer having an epoxy functional group in the side chain enables one to obtain non-shrinkable homogeneous/transparent material even for sol-gel process precursors not having polymerizable groups like tetraethoxysilanes, methoxysilanes, or like silanes.

In embodiments, the disclosure provides non-shrinking composite materials and articles comprising chemically linked organic and sol-gel polymers.

In embodiments, the disclosure provides a sol-gel method for a one-pot synthesis to form, for example, non-shrinkable organic-sol-gel composite materials having a high solid product yield (e.g., >90 wt %). Organic-sol-gel composite materials, and method for its production are provided where a metal (M) alkoxide is alcoholyzed in a mixture of glycols, polydiols, or diols, and subsequent reaction with polymerizable monomers, polymerizable oligomers, or both, having at least one unsaturated group to form a gel with simultaneous interaction of the sol-gel process by-product (e.g., primary alcohols) with the reactant containing the at least one unsaturated group and subsequent polymerization and cross-linking of that product.

In embodiments, the disclosure provides organic-sol-gel nanocomposite materials and solid articles thereof having a network of sol-gel and organic polymer chains.

In embodiments, the disclosure provides a composite comprising: interpenetrating networks comprised of:

an organo modified-inorganic network comprised of a source of metal oxide, and a source of a diol, glycol, or a combination of a diol and glycol; and an organic network comprised of a source of a polymer having polymerized hydroxy-alkoxy substituted acrylate groups, and a polymer cross-linker.

In embodiments, the disclosure provides a composite prepared by any of the preparative processes disclosed herein.

In embodiments, the disclosure provides a method for making a non-shrinking material having an organic co-polymer(s) embedded in a sol-gel matrix where both phases are covalently bonded to each other.

The starting reactants can be selected so that the resulting product does not shrink during the entire process including an optional drying procedure with the exception of minor shrinkage (e.g., less than about 10% by volume) due to the contraction of the polymeric phase volume during the liquid organic monomer polymerization.

In embodiments, the disclosure provides a method that includes: forming a solution or mixture of the following reactants:

a metal alkoxide(s) of the formula $R_x$-M$(OR^1)_{4-x}$, wherein M is Si, Ti, Al, or Zr, or like metals and combinations thereof, R, if present, is an organic radical, $OR^1$ is a hydrolyzable low molecular weight alkoxy group, and x is from 0 to 3, such as tetramethoxysilane (TMOS), tetraethoxysilane (TEOS), 3-(trimethoxysilyl)propyl methacrylate (TMSPM), titanium ethoxide (TEO), titanium isopropoxide (TIPO), aluminum triethoxide (ATO), aluminum isopropoxide (AIPO), zirconium ethoxide (ZEO), and like metal oxides, or combinations thereof;

a glycol, a diol, or a mixture thereof, which can be, for example, ethylene glycol, propane-1,2-diol, or polydiols such as polyethylene glycol (PEG) or propylene glycol (PPG) (the mole ratios of the metal alkoxide and the glycol or diol component can be, for example, from about 1:1 to about 1:2, which is sufficient for the complete expenditure of all alcohol molecules in an alcoholysis reaction of the metal alkoxide);

a monomer or an oligomer containing at least one acrylate group or acrylamide group, such as glycidyl acrylate, (the mole ratios of the metal alkoxide with respect to the monomer or oligomer component can be, for example, from about 1:1 to about 1:2.5, which is sufficient for the complete expenditure of all alcohol molecules in the alcoholysis reaction of the metal alkoxide);

a cross-linking agent, such as (ethylene glycol)$_n$ dimethacrylate/diacrylate or divinyl esters where n ranges from about 1 to about 4, trimethylolpropane ethoxylate (e.g., 1 EO/OH, 7/3 EO/OH, etc.), bisphenol A ethoxylate (e.g., 2 EO/phenol) diacrylate or dimethacrylate, divinyl benzene, and like agents, or combinations thereof (the mole percentages of the cross-linking agent relative to the unsaturated monomers can be, for example, from about 1% to about 10%); and a free-radical polymerization initiator, such as azo-compounds (e.g., azobisisobutyronitrile), or organic peroxides (e.g., benzoyl peroxide, dicumyl peroxyde) (content of the initiator can be, for example, from about 0.1 to about 4.5% by weight relative to the monomers).

In embodiments, the mixture can be prepared in two steps. First, metal alkoxide and glycol or diol, are mixed with heating to give a transparent homogeneous solution. Then, the other above listed components can be added, and the mixture heated until the alcoholysis reaction and the polymerization process are complete. The resulting composite materials do not contain any liquid by-products and do not shrink.

In embodiments, the disclosure provides processes that can use a metal alkoxide such as $Si(OEt)_4$ (i.e., TEOS), or $Ti(OR^1)_4$ where $R^1$ is alkyl, or like metal alkoxide, which do not have or do not include a free-radical polymerizable R group. In embodiments, the disclosure can provide substantially or completely transparent final products. Such transparent products can be obtained, for example, when TEOS, or like metal alkoxides are selected as the inorganic oxide source or precursor component, and where the metal alkoxide does not have an organic polymerizable group in the metal alkoxide.

In embodiments, the disclosure provides processes that can use a metal alkoxide of the formula $R-M(OR^1)_3$ such as $R-Si(OR^1)_3$ or $R-Ti(OR^1)_3$, or of the formula $M(OR^1)_4$, where R, $R^1$, or both, exclude a free-radical polymerizable group.

In embodiments of the disclosure, the problems of drying and shrinkage-effect in sol-gel preparative processes can be solved by selecting reactants which do not require added solvent and which reactants produce intermediate products which can consume or incorporate any liquid by-products into the final product.

A highly efficient process for preparing low- or non-shrinking sol-gel-polymer composites has been developed.

Figure 3:
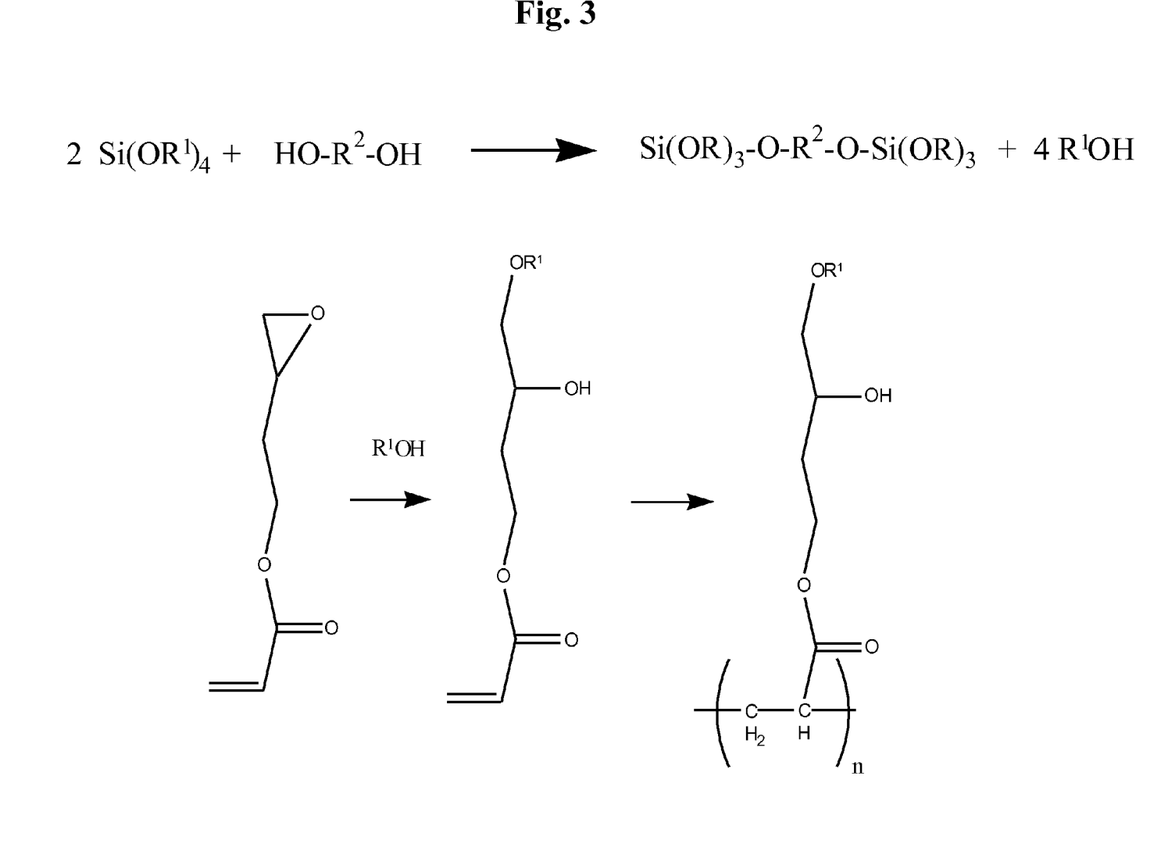
FIG. 3 shows an example reaction sequence leading to a composite of FIG. 1 (cross linking not shown).

In embodiments, one exemplary process is shown in FIG. 3, where $R^1OH$ is a liquid by-product, M is a metal, $R^1$ and $R^2$ are, for example, alkyl, m is arbitrary, and n can be 1 to 5, and p can be from about 10 to about 100,000,000 or more.

Figure 1:
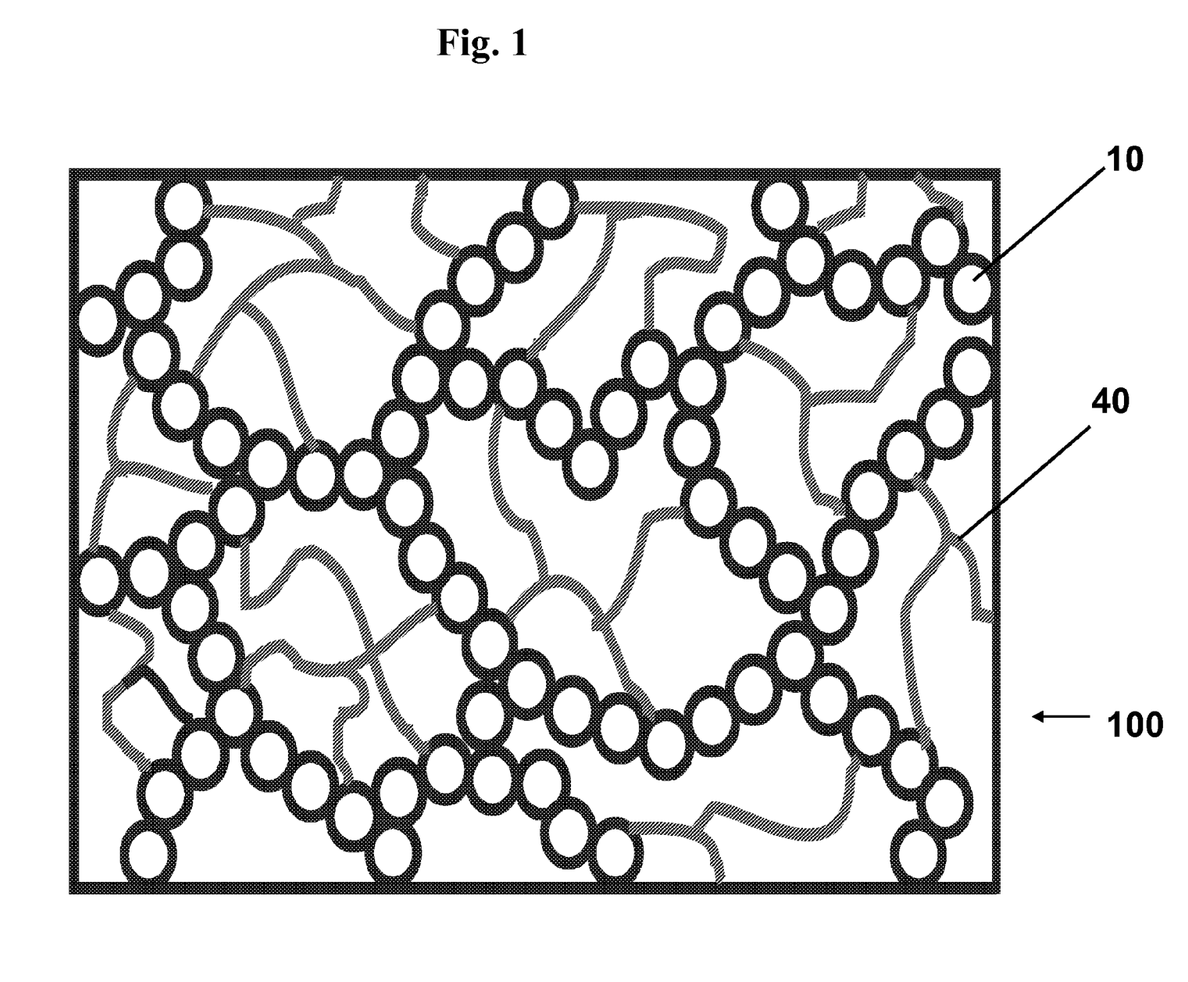
FIG. 1 schematically shows a composite comprised of a sol-gel polymer network, and a cross-linked interpenetrating organic polymer network, in embodiments of the disclosure.

In embodiments, the disclosure provides compositions and methods for making low shrinkage or completely non-shrinking material comprised of an inorganic metal oxide matrix having an interpenetrating network of an organic polymer. In embodiments, the disclosure provides a one-pot sol-gel method for forming a sol-gel polymer material comprising a non-shrinkable organic-inorganic composite material having high solid product yields, e.g., greater than about 90%. Starting materials, intermediates, organic-inorganic composite products, and method for making the composite are disclosed. Referring again to FIG. 2, the method of making the composite generally involves the following. A metal alkoxide is alcoholyzed in a mixture of a glycol or like diol, or both, to form a transparent solution having a first sol-gel intermediate (10). Next, an unsaturated monomer or unsaturated oligomer having at least one of an epoxy group, a glycidyl ether group, or a combination thereof, such as a glycidyl acrylate of the formula $CH_2=(O)=CH-(CH_2)_2-O-C(=O)-C(CH_3)=CH_2$, or an allyl glycidyl ether compound of the formula $CH_2=CH-CH_2-O-CH_2-CH=(O)=CH_2$, is added to the mixture to first react within the liberated alcohol $R^1OH$ (20), and the resulting unsaturated alcohol adduct (30) polymerizes to form a polymer (40), which can be optionally cross-linked to form an interpenetrating network with the sol-gel product. As shown in FIG. 1, the resulting organic-sol-gel composite material (100) comprises a network of inorganic oxides (10) having inter-penetrating chains (40) of the in situ polymerized monomer, such as an acrylate polymer formed from polymerized unsaturated monomers.

The starting reactants can include, for example, a metal (M) alkoxide, where M is, e.g., Si, Al, Ti, Zn, and like metals, or mixtures thereof, and a glycol or diol, such as ethylene glycol, propane-1,2-diol, and like glycols or polyglycols (such as polyethylene glycol, polypropylene glycol, and like polyglycols), an alcohol reactive unsaturated monomer such as a glycidyl methacrylic acid ester, a cross-linking agent, such as a di-acrylic, di-methacrylic, or like esters of mono-diethylene glycol, or divinylbenzene, and a free radical polymerization initiator or agent, such as AIBN, benzoyl peroxide, dicumyl peroxide, and like initiators, or actinic radiation.

The alcoholysis or glycolysis, of metal alkoxides provides metal alkoxide adducts, which are the precursors of a sol-gel network and an alcohol by-product. The alcohol by-product can react with the unsaturated glycidyl monomer or epoxy monomer forming an unsaturated hydroxy-ether adduct, which unsaturated adduct polymerizes and cross-links in the presence of a cross-linking agent. The cross-linking agent can be present in an amount of, for example, from about 0.001 to about 5 wt % based on the weight of the added unsaturated monomer.

The simultaneous operation of two reaction processes, i.e., a sol-gel formation by an alcoholysis manifold, and a free-radical polymerization manifold, having alcoholysis by-product participation and conversion into the organic polymer manifold, provides a solid sol-gel product network having intimately interwoven on a molecular level with a cross-linked interpenetrating network of polymer chains.

The product can be formed as a consolidated monolithic substrate without dimensional or form limitations due to the absence of any substantial liquid by-product.

The structure and composition of composite material can be readily varied within a broad range because many different metal alkoxides and many different unsaturated organic monomers can be selected for use in the process.

In embodiments, the disclosure provides a solvent-less method of making an organic-sol-gel composite comprising, for example:

a first heating of a first mixture comprising:
  i) a metal alkoxide of the formula $R_x-M(OR^1)_{m-x}$,
where
  M is Si, Al, Ti, Zn, or a combination thereof,
  R, if present, is a substituted or unsubstituted, saturated or unsaturated, monovalent hydrocarbyl group having from 1 to about 10 carbon atoms,
  $OR^1$ is each independently an alcoholyzable hydrocarbyloxy group having from 1 to about 10 carbon atoms,
  x is 1 to 4, and
  m is 5 to 2; and
  ii) a diol or glycol of the formula $HO-R^2-OH$,
where
  $R^2$ is a substituted or unsubstituted, divalent hydrocarbylene having from 1 to about 10 carbon atoms, or an oligomeric or polymeric group comprising at least one chain incorporating a plurality of alkoxyl groups, to form a sol-gel network comprised of the formula $-(-M-O-R^2-O)_n-$ where n is from about 1 to about 1,000,000; and
a second heating of the first intermediate in the presence of:
  iii) an unsaturated monomer or unsaturated oligomer having at least one of an epoxy group, a glycidyl ether group, or a combination thereof, such as a glycidyl acrylate of the formula $CH_2=(O)=CH-(CH_2)_2-O-C(=O)-C(CH_3)=CH_2$, or an allyl glycidyl ether compound of the formula $CH_2=CH-CH_2-O-CH_2-CH=(O)=CH_2$;

iv.) a cross-linker, such as a divinyl compound of the formula $CH_2=CH-R^3-CH=CH_2$ where $R^3$ can be, for example, hydrocarbyl or oxyhydrocarbyl with from 1 to about 30 carbon atoms; and v.) a free radical initiator.

In embodiments, the first heating can be accomplished, for example, with heating at from about 40 to about 150 degrees C., for about 0.5 to about 5 hours.

In embodiments, the second heating can be accomplished, for example, with heating at an increasing temperature, such as in a gradient or in one or more steps, of from about 45 or 50 degrees C. to about 150 degrees C., over a period of for about 20 to about 100 hours.

Specific metal alkoxides can be, for example, at least one trialkoxyvinylsilane, styrylethyltrialkoxysilane, tetraalkoxysilane, titanium alkoxide, aluminum trialkoxide, tin tert-alkoxide, hafnium alkoxide, tantalum alkoxide, zirconium alkoxide, or a combination thereof, for example, tetraethoxysilane (TEOS), styrylethyltrimethoxysilane (SEMS), tetramethoxysilane (TMOS), titanium ethoxide (TEO), titanium isopropoxide (TIP), aluminum triethoxide (ATO), aluminum tributoxide (ATB), tin tert-butoxide (TTB), hafnium butoxide (HAB), tantalum ethoxide (TAE), aluminum isopropoxide (AIPO), zirconium ethoxide (ZEO), zirconium propoxide (ZIP), and like metal alkoxides, or a combination thereof.

Specific examples of the diol can be at least one of an alkylene glycol, a propylene glycol, a poly(alkylene glycol), a bisphenol, an alkoxylated bisphenol diol, or a combination thereof, such as ethylene glycol, 1,2-propylene glycol, a polyethylene glycol, a poly(propylene glycol), a bisphenol, an alkoxylated phenol such as an ethoxylated phenol, and like diol compounds, or a combination thereof.

In embodiments, the mole ratio of the metal alkoxide and the unsaturated monomer component or its corresponding polymerized component can be, for example, from about 1:1 to about 1:2, which is enough for the complete consumption of all alcohol molecules generated in the alcoholysis or glycolysis reaction of the metal alkoxide.

Specific examples of the cross-linker or cross-linking agent can be at least one of a dialkylene glycol diacrylate, a dialkylene glycol dimethacrylate, a trimethylolpropane alkoxylate triacrylate, a divinylaryl, such as divinylbenzene, and like cross-linkers, or a combination thereof, such as a dialkylene glycol diacrylate such as (ethylene glycol)$_n$-dimethacrylate or -diacrylate, or a divinyl ester, where n is from 1 to 4, a trimethylolpropane ethoxylate triacrylate (having, e.g., 1:1 EO:OH, 7:3 EO:OH, and like equivalent levels of ethoxylation), bisphenol A ethoxylate (e.g., 2 EO per phenol) diacrylate or dimethacrylate, and divinyl benzene. Useful molar equivalent percentages of the cross-linking reagent relative to the content of the unsaturated monomer can be from about 0.1% to about 10%. In embodiments, a preferred cross-linker family can be, for example, trimethylolpropane ethoxylate triacrylate cross-linkers, available from Sigma-Aldrich, for example, trimethylolpropane ethoxylate (14:3=EO:OH) triacrylate, trimethylolpropane ethoxylate (7:3=EO:OH) triacrylate having an average $M_n$ of about 912, and like cross-linkers, or a combination thereof.

The free-radical initiator can be, for example, at least one of a thermo-polymerization initiator, a photo-polymerization initiator, or a combination thereof, such as an azo-compound (e.g.: azobisisobutyronitrile, AIBN), organic peroxides (e.g., benzoyl peroxide, dicumyl peroxide) and like initiators. Preferred amounts of the initiator can be, for example, from about 0.1 to about 0.5% by weight relative to the monomer, or sufficient actinic radiation, or combinations thereof, and like polymerization initiators.

The first heating and second heating can be accomplished, for example, free of any added solvent or diluent. In embodiments, the method can be accomplished in a single vessel, that is, a single-pot.

In embodiments, the second heating, such as with mild heating, can be accomplished, for example, until the solid product has a constant weight, i.e., free of any significant weight change. The second heating provides a homogeneous solid monolith composite free of shrinking, cracking, or a combination thereof.

The reaction mixture can have a volume contraction during the preparative process of less than about 10%. The final solid product can have a volume shrinkage on drying of, for example, less than about 10%.

In embodiments, the preparative method can have an intermediate reaction mixture comprising the alcoholyzed metal alkoxide and can further comprise the external addition of at least one additional unsaturated polymerizable monomer.

In embodiments, the disclosure provides a sol-gel polymer composite having interpenetrating networks comprising:

a sol-gel inorganic polymer network comprised of the product of a metal alkoxide and at least one of a diol; and a cross-linked organic polymer network comprised of the polymerization product of an epoxy or glycidyl ether containing unsaturated monomer, a cross-linker, and a free-radical initiator, the cross-linked organic polymer network having at least one covalent bond to the sol-gel polymer network.

In embodiments, the composite of the disclosure can contain, for example, from about 10 to about 90 wt % sol-gel polymer; and from about 90 to about 10 wt % of the cross-linked organic polymer based on the total weight of the composite. In embodiments, the at least one covalent bond to the sol-gel polymer can be, for example, a plurality of bonds to the sol-gel polymer. The extent of covalent attachment between the sol-gel polymer network and the organic polymer network can be selected, such as by selection of cross-linker and reactants, to render the networks in the resulting composite essentially inseparable by physical means. The sol-gel-polymer composite having interpenetrating networks of the disclosure is not believed to have any substantial or observable macroscopic surface boundary between the organic and inorganic components.

In embodiments, the disclosure provides a sol-gel-polymer composite comprising combining the respective products of:

a first reaction comprising a mixture comprised of a metal alkoxide and at least one diol; and a second reaction comprising the alcohol by-product of the first reaction and a mixture comprised of an epoxy, glycidyl, or like functionalized unsaturated monomer, a cross-linker, and a free-radical initiator.

The sol-gel-polymer composite prepared by the above process can further include, if desired or if necessary, drying the product of the second reaction until the solid has a constant weight and volume by, for example, continued heating, and with or without vacuum.

The resulting solid composite product does not contain, or is free-of, any liquid by-products and thus avoids having any product shrinkage attributable to liquid removal or evaporation.

In embodiments, the disclosure provides a sol-gel method for a one-pot synthesis for forming non-shrinkable organic-inorganic hybrid polymeric materials with high yield of solid product (>90%). Starting compositions, sol-gel-polymer hybrid materials and method for its production are disclosed whereby a metal (M) alkoxide (where M is Si or any others) is alcoholyzed in the mixture of diol, glycols, polydiols, or like reactants, at elevated temperature (50-150° C.) without any catalysts. Then one or more monomers having an epoxy or glycidyl group can be added to form a homogeneous transparent solution as a result of an interaction (i.e., reaction) of the sol-gel process by-product (primary alcohols) with the reactant containing the epoxy or glycidyl group for the subsequent polymerization of the resulting reaction mixture.

According to methods of the disclosure the starting solution (the mixture of reactants and reagents) can be selected so that the resulting product material does not shrink during the entire preparative process, including the drying procedure with the exception of the small (less than about 10%) shrinkage due to the contraction of the polymeric phase in the course of the liquid organic monomer polymerization.

The preparative method includes forming a solution or mixture of the following reactants and regents:

a metal alkoxide of the general formula $R_xM(OR^1)_{4-x}$, where

M is the atom of Si, Ti, Al, or Zr;

R is an organic radical;

R' is a hydrolyzable low molecular weight alkyl group, and x is from 1 to 4; and a glycol or diol; and thereafter combining, for example, adding to the heated first solution or mixture, at least one monomer or oligomer containing at least one epoxy or glycidyl groups;

a cross-linker; and a free radical polymerization initiator, followed by a second heating.

In embodiments, the disclosed preparative methods can be accomplished, for example, as follows. First, the metal alkoxide and the alcohol or the glycol can be mixed at a temperature of about 100 to 150° C. to give a transparent homogeneous solution. Then the other components are added to the solution followed by heating the resulting mixture to complete the alcoholysis reaction and the polymerization reaction (FIG. 1). The resulting hybrid materials produced according to the disclosure are substantially free of liquid by-products, such as from about 0.1 wt % to about 2 wt %. The low levels or absence of liquid by-products avoids shrinkage.

EXAMPLES

The following examples serve to more fully describe the manner of using the above-described disclosure, and to further set forth the best modes contemplated for carrying out various aspects of the disclosure. It is understood that these examples do not limit the scope of this disclosure, but rather are presented for illustrative purposes. The working examples further describe how to prepare the hybrids of the disclosure.

Definitions

"d" designates density

"TGA" designates Thermo Gravimetric Analysis

"TMA" designates Thermal Mechanical Analysis

"CTE" designates coefficient of thermal expansion

"H" designates Shore D hardness

Test Methods

Density The density of each sample was determined by conventional Archimedean method. The sample weight in air and in deionized water was measured using a digital scale with an accuracy of 0.0001 gram. The volume of each sample was determined by liquid displacement. The final density was computed from the sample weight and sample volume.

Thermal/Mechanical Properties

TGA/DTA was conducted on the composite samples using an STA 409C Netzsch instrument. All of the TGA measurements were conducted under an air environment (100 mL/min) with nitrogen purge. The samples were heated from 20° C. to 600° C. at 5° K/min. A two-point Curie Point Temperature Calibration with nickel and perkalloy were performed to verify the accuracy of the TGA system.

TMA Specimens were cut from flat sheets and scanned in the TMA TA Instruments Q400 (www.tainstruments.com) from 20° C. to 200° C. at 5° C./min (static air atmosphere).

CTE Measurement The coefficient of thermal expansion (CTE) was measured by the TMA method. Specimens were cut from block samples and scanned in the TMA TA Instruments Q400 from 20° C. to 200° C. at 5° C./min., although the direction of the method was perpendicular to the surface of the sample (X-Y), i.e., along Z-direction. The CTE was considered as a property for the entire bulk sample because of its uniformity isotropic nature.

Measuring the amount of inorganic moiety A portion of sample (e.g., 1 to 1.5 g) was weighted and heated in an oven at 600° C. for about 3 about 4 hours in air. The amount of inorganic moiety was the residual weight after heating.

Measurement of surface hardness Those measurements were made with the use of the hardness meter Bareiss 7938 Oberdischingen, Germany.

Example 1

The inner walls of a glass ampoule were hydrophobized with dichlorodimethylsilane (DCDMS) in dry decane. A transparent solution was prepared in the treated ampoule from the mixture of 3.1798 g (0.01526 mole) of tetraethoxysilane (TEOS) and of 1.4319 g (0.02307 mole) of ethylene glycol (EG) by heating at 150° C. for 3 h. Glycidyl methacrylate, 6.5299 g (0.04593 mole), was added to the solution and the mixture was shaken and heated at 80° C. for about 0.5 hr. Then 0.0656 g of benzoyl peroxide (BP), 0.0196 g of dicumyl peroxide (DCP), and 0.5007 g (0.00234 mole) of diethylene glycol diacrylate (DADEG) were added to the ampoule and sealed in air (mole ratios: TEOS/EG=1/1.51; TEOS/GMA=1/3.01). After stirring the reaction mixture for 0.5 hr at ambient temperature, the solution was heated in an oven according to the schedules in Table 1.

TABLE 1

Heating Schedules.

| Example | Temp (° C.) | Time (h) |
|---------|-------------|----------|
| 1, 4, 5 | 45 | 10 |
|         | 50 | 2 |
|         | 60 | 6 |
|         | 80 | 15 |
|         | 100 | 6 |
|         | 120 | 3 |
|         | 135 | 2 |
| 2       | 50 | 2 |
|         | 60 | 3 |
|         | 80 | 4 |
|         | 100 | 10 |
|         | 120 | 5 |
|         | 135 | 4 |
| 3, 8    | 40 | 10 |
|         | 50 | 2 |
|         | 60 | 4 |
|         | 80 | 6 |
|         | 100 | 3 |
|         | 120 | 2 |

TABLE 1-continued

Heating Schedules.

| Example | Temp (° C.) | Time (h) |
|---------|-------------|----------|
| 6, 7    | 45          | 12       |
|         | 50          | 2        |
|         | 60          | 3        |
|         | 80          | 9        |
|         | 100         | 3        |
|         | 120         | 2        |

The yield of the solid translucent homogeneous product (block: 1.5 cm; thickness=10 cm) was 91.5 wt %. The physical properties of the sol-gel-polymer hybrid were measured according to the test methods defined above and are summarized in Table 2.

TABLE 2

Physical properties of sol-gel-polymer hybrids and of pure organic polymer models.

| Example | d (g/cm$^3$) | CTE (25-100° C.) $10^{-6}$° C.$^{-1}$ | TGA/TMA data Beginning of degradation | Residual mass @ 600° C. | Surface hardness Shore D |
|---------|--------------|-----|------|-------|----|
| Pure polymer model for TEOS comprising systems |
| 3       | 1.21         | 310 | 227° C. | —   | 55 |
| Sol-Gel-Polymer hybrids comprising TEOS |
| 1       | 1.30         | 190 | 258° C. | 8.50% | 75 |
| 2       | 1.30         | 185 | 227° C. | 7.00% | 70 |
| Pure polymer model for TMSPM or TMSPA comprising systems |
| 8       | 1.26         | 188 | 224° C. | —   | 64 |
| Sol-Gel-Polymer hybrids comprising TMSPM or TMSPA |
| 4       | 1.28         | 121 | 265° C. | 7.60% | 82 |
| 5       | 1.32         | 89  | 288° C. | 15.40% | 88 |
| 6       | 1.24         | 143 | 262° C. | 10.30% | 77 |
| 7       | 1.30         | 120 | 295° C. | 15.40% | 82 |

Example 2

The same procedure as in Example 1 was followed, but with the use of 1.7010 g (0.08165 mole) tetraethoxysilane (TEOS) and of 1.0200 g (0.01643 mole) of ethylene glycol (EG). Glycidyl methacrylate, 4.6751 g (0.03288 mole), was added to that solution and the mixture was shaken and heated at 80° C. during half an hour. Then 0.0324 g of benzoyl peroxide (BP), 0.0138 g of dicumyl peroxide (DCP) and 0.1905 g (0.000889 mole) of diethylene glycol diacrylate (DADEG) were added in a glass ampoule which was sealed in air (mole ratios: TEOS/EG=1/2.01; TEOS/GMA=1/4.03). After stirring the reaction mixture for half an hour at ambient temperature, the solution was heated in an oven according to the schedule in Table 1.

The weight yield of the solid transparent product (block: 1.2 cm; thickness 0.9 cm) was equal to 93.0%.

Physical properties of the sol-gel-polymer hybrid are provided in Table 2.

Comparative Example 3

The polymerized mixture was prepared from 7.2932 g (0.0513 mole) of glycidyl methacrylate (GMA), 2.4812 g (0.0539 mole) of ethyl alcohol, 0.0379 g of benzoil peroxide and of 0.0354 g of dicumyl peroxide. After stirring the reaction mixture for half an hour at ambient temperature into the sealed ampoule, the solution was heated in an oven according to the schedule in Table 1.

The yield of the solid transparent product (block: 1.8 cm; thickness 14 cm) was equal to 97.0 wt %.

Physical properties of the pure organic polymer are provided in Table 2.

Example 4

The same procedure as in Example 1 was followed with the exception that 4.0658 g (0.01664 mole) of 3-(trimethoxysilylpropyl)methacrylate (TMSPM), of 1.5518 g (0.02500 mole) of ethylene glycol (EG) was used and the resulting mixture was heated at 100° C. during 1 h. Glycidyl methacrylate, 5.8299 g (0.0410 mole), was added to that solution, the mixture was shaken, and then heated at 80° C. for 0.5 hr. Then 0.0494 g of BP, 0.0296 g of DCP and 0.6269 g (0.0029 mole) of diethyleneglycol diacrylate (DMDEG) were added in a glass ampoule which was sealed in air (mole ratios: TMSPM/EG=1/1.53; TMSPM/GMA=1/2.50). After stirring the reaction mixture for 0.5 hr at ambient temperature, the solution was heated in an oven according to the schedule in Table 1, Example 4.

The yield of the solid transparent product (block: 1.5 cm; thickness 13 cm) was equal to 98.9 weight %.

Physical properties of the sol-gel-polymer hybrid are provided in Table 2.

Example 5

The same procedure as in Example 4 was followed with the exception that 5.0000 g (0.02013 mole) of TMSPM and of 2.0133 g (0.03019 mole) of EG was used. After the heating the resulting mixture at 100° C. during 1 h, 76.5 wt % of methyl alcohol (by-product) was evaporated from transparent homogeneous solution. Glycidyl methacrylate, 2.1752 g (0.01530 mole), was added to that solution and the mixture was shaken and heated at 80° C. during half an hour. Then 0.0372 g of BP and 0.0238 g of DCP were added in a glass ampoule which was sealed in air (mole ratios: TMSPM/EG=1/1.50; TMSPM/GMA=1/0.76). After stirring the reaction mixture for half an hour at ambient temperature, the solution was heated in an oven according to the schedule in Table 1.

The yield of the solid transparent product (block: 2.0 cm; thickness 10 cm) was equal to 97.8 wt %.

Physical properties of the sol-gel-polymer hybrid are provided in Table 2.

Example 6

The same procedure as in Example 4 was followed, with the exception that 3.3534 g (0.01350 mole) of TMSPM and of 1.7131 g (0.02251 mole) of propylene glycol (PG) were used and the resulting mixture was heated at 100° C. for 2 h. Glycidyl methacrylate, 5.6198 g (0.03953 mole) was added to that solution and the mixture was shaken and heated at 80° C. for half an hour. Then 0.0279 g of BP, 0.0326 g of DCP and 0.0584 g (0.00027 mole) of diethyleneglycol diacrylate (DADEG) were added in a glass ampoule which was sealed in air (mole ratios: TMSPM/PG=1/1.67; TMSPM/GMA=1/2.93). After stirring the reaction mixture for half an hour at ambient temperature, the solution was heated in an oven according to the schedule in Table 1. The yield of the solid transparent product (block: 1.5 cm; thickness 15 cm) was 95.9 wt %. Physical properties of the sol-gel-polymer hybrid are provided in Table 2.

Example 7

The same procedure as in Example 4 was followed with the exception that 10.55 g (0.04502 mole) of 3-(trimethoxysilyl-propyl)acrylate (TMSPA) and of 5.1390 g (0.06753 mole) of propylene glycol (PG) were used. After heating the resulting mixture at 100° C. for 1 h, 61.8 wt % of methyl alcohol (by-product) was evaporated from transparent homogeneous solution. Glycidyl methacrylate, 8.3030 g (0.05770 mole) was added to that solution and the mixture was shaken and heated at 80° C. for half an hour. Then 0.0551 g of BP, 0.0421 g of DCP, and 0.0600 g (0.00028 mole) of diethylene glycol diacrylate (DADEG) were added in a glass ampoule, which was sealed in air (mole ratios: TMSPA/PG=1/1.50; TMSPA/GMA=1/1.28). After stirring the reaction mixture for half an hour at ambient temperature, the solution was heated in an oven according to the schedule in Table 1. The yield of the solid transparent product (block: 2.2 cm; thickness 12 cm) was 98.4 wt %. Physical properties of the sol-gel-polymer hybrid are provided in Table 2.

Comparative Example 8

The polymerized mixture was prepared from 7.2932 g (0.0513 mole) of GMA, 2.4812 g (0.0539 mole) of methyl alcohol, 0.0379 g of BP, and of 0.0354 g of DCP. After stirring the reaction mixture for half an hour at ambient temperature in a sealed ampoule, the solution was heated in an oven according to the schedule in Table 1. The yield of the solid transparent product (block: 1.4 cm; thickness 13 cm) was 97.0 wt %. Physical properties of the pure organic polymer are provided in Table 2.

The disclosure has been described with reference to various specific embodiments and techniques. However, it should be understood that many variations and modifications are possible while remaining within the spirit and scope of the disclosure.

What is claimed is:

1. A method for making a composite comprising:
   a first heating of a first mixture comprising:
   i) a metal alkoxide of the formula $R_x$-$M(OR^1)_{m-x}$,
   wherein
   M is Si, Al, Ti, Zr, or a combination thereof,
   R, if present, is a substituted or unsubstituted, saturated or unsaturated, monovalent hydrocarbyl group having from 1 to about 10 carbon atoms,
   $OR^1$ is each independently an alcoholyzable hydrocarbyloxy group having from 1 to about 10 carbon atoms,
   x is 0 to 3, and
   m is 5 to 2; and
   ii) a diol of the formula HO—$R^2$—OH,
   wherein
   $R^2$ is a substituted or unsubstituted, divalent hydrocarbylene having from 1 to about 10 carbon atoms, or an oligomeric or polymeric group comprising at least one chain incorporating a plurality of alkoxyl groups, to form a first intermediate sol-gel network resulting from alcoholysis of the metal alkoxide, and an alcohol by-product ($HOR^1$); and
   a second heating of the first intermediate sol-gel network and the alcohol by-product ($HOR^1$) in the presence of:
   iii) an unsaturated monomer or unsaturated oligomer having at least one of an epoxy group, a glycidyl ether group, or a combination thereof;
   iv) a cross-linker; and
   v) a free radical initiator.

2. The method of claim 1 wherein the alcohol by-product ($HOR^1$) reacts with the unsaturated monomer or unsaturated oligomer having at least one epoxy group or a glycidyl ether group, to form an unsaturated monomer having a side chain including a hydroxy group and an ether group (—$OR^1$), which unsaturated monomer polymerizes with itself and with the cross-linking agent, and the hydroxy group interacts with the product of the first heating, to form the composite.

3. The method of claim 1 wherein the first heating is accomplished at from about 50 to about 150 degrees C., for about 0.5 to about 5 hours, and the second heating is accomplished at an increasing temperature of from about 45 to about 150 degrees C., over a period of for about 20 to about 100 hours.

4. The method of claim 1 wherein:
   the metal alkoxide comprises at least one of tetraalkoxysilane, titanium alkoxide, aluminum trialkoxide, zirconium alkoxide, or a combination thereof;
   the diol HO—$R^2$—OH comprises at least one of an alkylene glycol, a propylene glycol, a poly(alkylene glycol), an alkoxylated bisphenol diol, or a combination thereof; and
   the unsaturated monomer comprises at least one of acrylate, methacrylate, acrylamide, or a combination thereof, having at least one epoxy or glycidyl group.

5. The method of claim 1 wherein:
   the free-radical initiator comprises at least one of a thermo-polymerization initiator, a photo-polymerization initiator, a free-radical source compound, or a combination thereof; and
   the cross-linker comprises at least one of a dialkylene glycol diacrylate, dialkylene glycol dimethacrylate, a trimethylolpropane alkoxylate triacrylate, divinylbenzene, or a combination thereof.

6. The method of claim 1 wherein the first heating and second heating being accomplished free of any added solvent or diluent, and in a single vessel.

7. The method of claim 1 wherein the first heating provides a transparent solution.

8. The method of claim 1 wherein the composite is free of shrinking, cracking, or a combination thereof.

9. The method of claim 1 wherein the second heating being accomplished until the solid product has a constant weight, a constant volume, or a combination thereof.

10. A sol-gel-polymer composite obtained by the method of claim 1.

* * * * *